United States Patent
Ichimaru et al.

(10) Patent No.: US 10,009,495 B2
(45) Date of Patent: Jun. 26, 2018

(54) IMAGE READING APPARATUS AND DOCUMENT TRANSPORT METHOD USED THEREFOR

(71) Applicant: PANASONIC INTELLECTUAL PROPERTY MANAGEMENT CO., LTD., Osaka (JP)

(72) Inventors: Katsuji Ichimaru, Saga (JP); Takashi Naito, Fukuoka (JP); Hiroshi Kusuda, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days. days.

(21) Appl. No.: 15/406,106

(22) Filed: Jan. 13, 2017

(65) Prior Publication Data
US 2018/0115669 A1    Apr. 26, 2018

(30) Foreign Application Priority Data

Oct. 21, 2016  (JP) ................................. 2016-207177

(51) Int. Cl.
    *H04N 1/00* (2006.01)
(52) U.S. Cl.
    CPC ..... *H04N 1/00793* (2013.01); *H04N 1/00625* (2013.01); *H04N 1/00628* (2013.01); *H04N 2201/0081* (2013.01)
(58) Field of Classification Search
    None
    See application file for complete search history.

(56) References Cited

U.S. PATENT DOCUMENTS

| | | | |
|---|---|---|---|
| 2005/0184453 A1* | 8/2005 | Sano ...................... | B65H 7/125 271/262 |
| 2007/0048060 A1* | 3/2007 | Sonoda .................. | B41J 11/006 400/636 |
| 2014/0042689 A1* | 2/2014 | Ota ......................... | B65H 3/06 271/10.11 |
| 2017/0210582 A1* | 7/2017 | Okano .................... | B65H 7/125 |

FOREIGN PATENT DOCUMENTS

| | | | |
|---|---|---|---|
| JP | 2001199582 A | * | 7/2001 |
| JP | 2008-024463 | | 2/2008 |

* cited by examiner

*Primary Examiner* — Thomas D Lee
(74) *Attorney, Agent, or Firm* — Greenblum & Bernstein, P.L.C.

(57) ABSTRACT

There is provided an image reading apparatus that, when double feeding of documents is detected by a double feeding detector, transports the documents in the reverse direction of the transport direction at least until the leading edges of the double-fed documents are positioned at the upstream side of transport roller pairs by rotating a separation roller and a retard roller so as to transport the documents in the reverse direction, and that thereafter transports the documents in the transport direction by rotating the separation roller so as to transport the documents in the transport direction. When the documents are transported in the reverse direction, the image reading apparatus sets a second rotation speed of the retard roller to be faster than a first rotation speed of the separation roller.

19 Claims, 13 Drawing Sheets

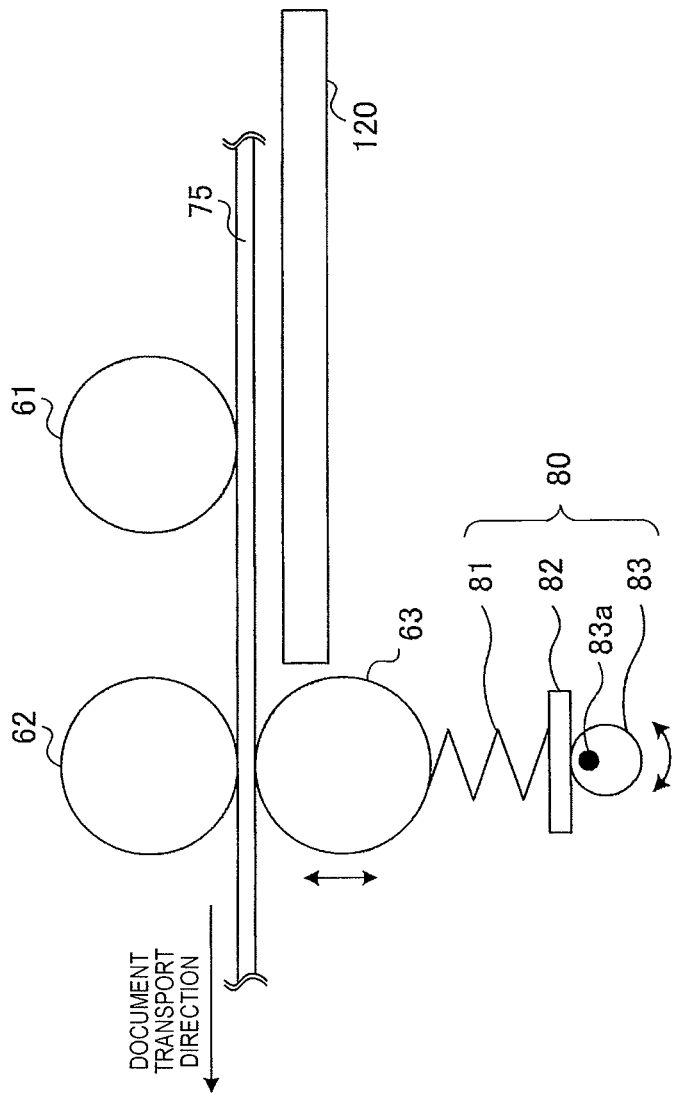

IMAGE READING APPARATUS AND DOCUMENT TRANSPORT METHOD USED THEREFOR

BACKGROUND

1. Technical Field

The present disclosure relates to an image reading apparatus and a document transport method used for the image reading apparatus.

2. Description of the Related Art

In the related art, an image reading apparatus that transports documents stacked on a document placing table (a paper feeding tray or a document tray) one by one to the document transport path, and that reads an image formed on the document by an image reading unit disposed on the document transport path and then discharges the document to a document discharge unit (paper discharge tray) is known.

In such an image reading apparatus, in order to avoid double feeding of documents, the double-fed documents are separated from each other by a retard roller. The image reading apparatus is disclosed, for example, in Japanese Patent Unexamined Publication No. 2008-024463.

However, in some cases, since the documents may not be separated from each other by the retard roller depending on the degree of close contact between the documents, there is a problem that double feeding of the documents cannot be avoided.

CITATION LIST

Patent Literature

PTL 1: Japanese Patent Unexamined Publication No. 2008-024463

SUMMARY

An object of the present disclosure is to provide an image reading apparatus, a document transport method, and a document transport program capable of reliably avoiding double feeding of documents.

According to the present disclosure, there is provided an image reading apparatus that transports a document stacked on a document placing table on the document transport path and reads an image formed on the document, including: transport roller pairs that include a separation roller and a retard roller, and that interpose and transport the document; an image reading unit that is disposed at the downstream side of the transport roller pairs in the transport direction of the document, and that reads an image formed on the document; a double feeding detector that is disposed between the separation roller and the retard roller and the image reading unit in the transport direction, and that detects double feeding of the documents; and a control unit that controls the rotation of the separation roller and the rotation of the retard roller, in which, when double feeding of the documents is detected by the double feeding detector, the control unit transports the documents in the reverse direction of the transport direction at least until the leading edges of the double-fed documents are positioned at the upstream side of the transport roller pairs by rotating the separation roller and the retard roller so as to transport the documents in the reverse direction, and then transports the documents in the transport direction by rotating the separation roller so as to transport the documents in the transport direction, and in which, when the documents are transported in the reverse direction, the control unit sets a second rotation speed of the retard roller to be faster than a first rotation speed of the separation roller.

According to the present disclosure, it is possible to reliably prevent double feeding of documents.

BRIEF DESCRIPTION OF THE DRAWINGS

FIG. 10 is a diagram illustrating a configuration example of a load adjustment unit according to the present exemplary embodiment;

DETAILED DESCRIPTION

Figure 1:
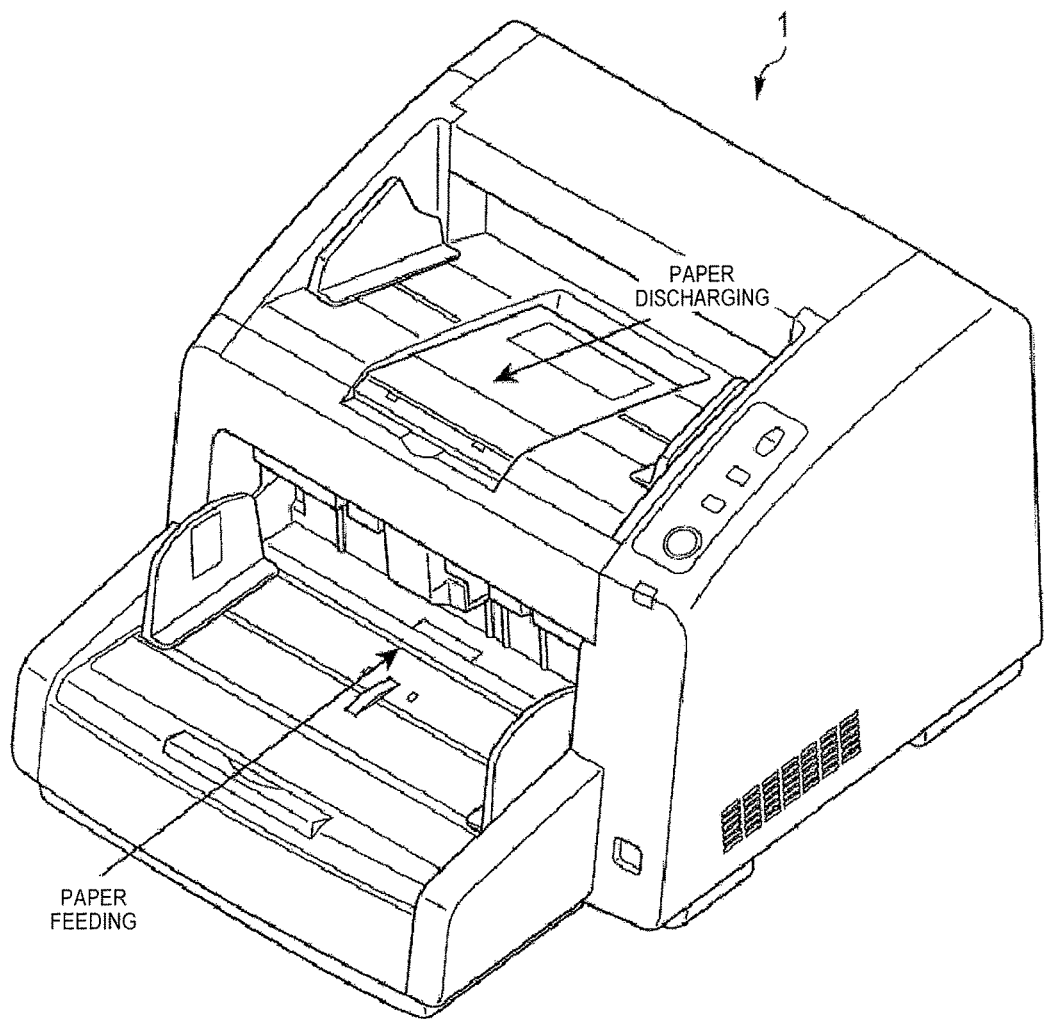
FIG. 1 is an overall perspective view of an image reading apparatus according to the present exemplary embodiment.
Figure 2:
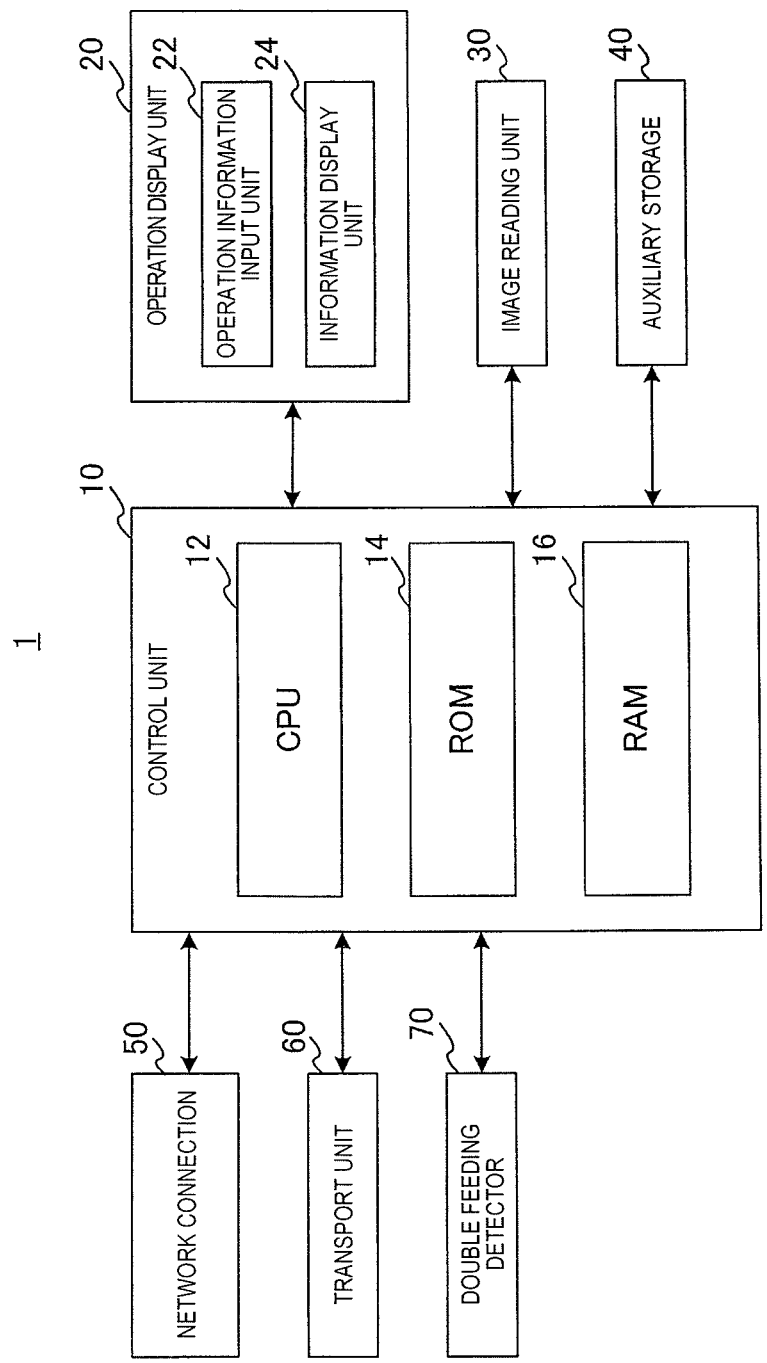
FIG. 2 is a block diagram illustrating the functional configuration of the image reading apparatus according to the present exemplary embodiment.
Figure 3:
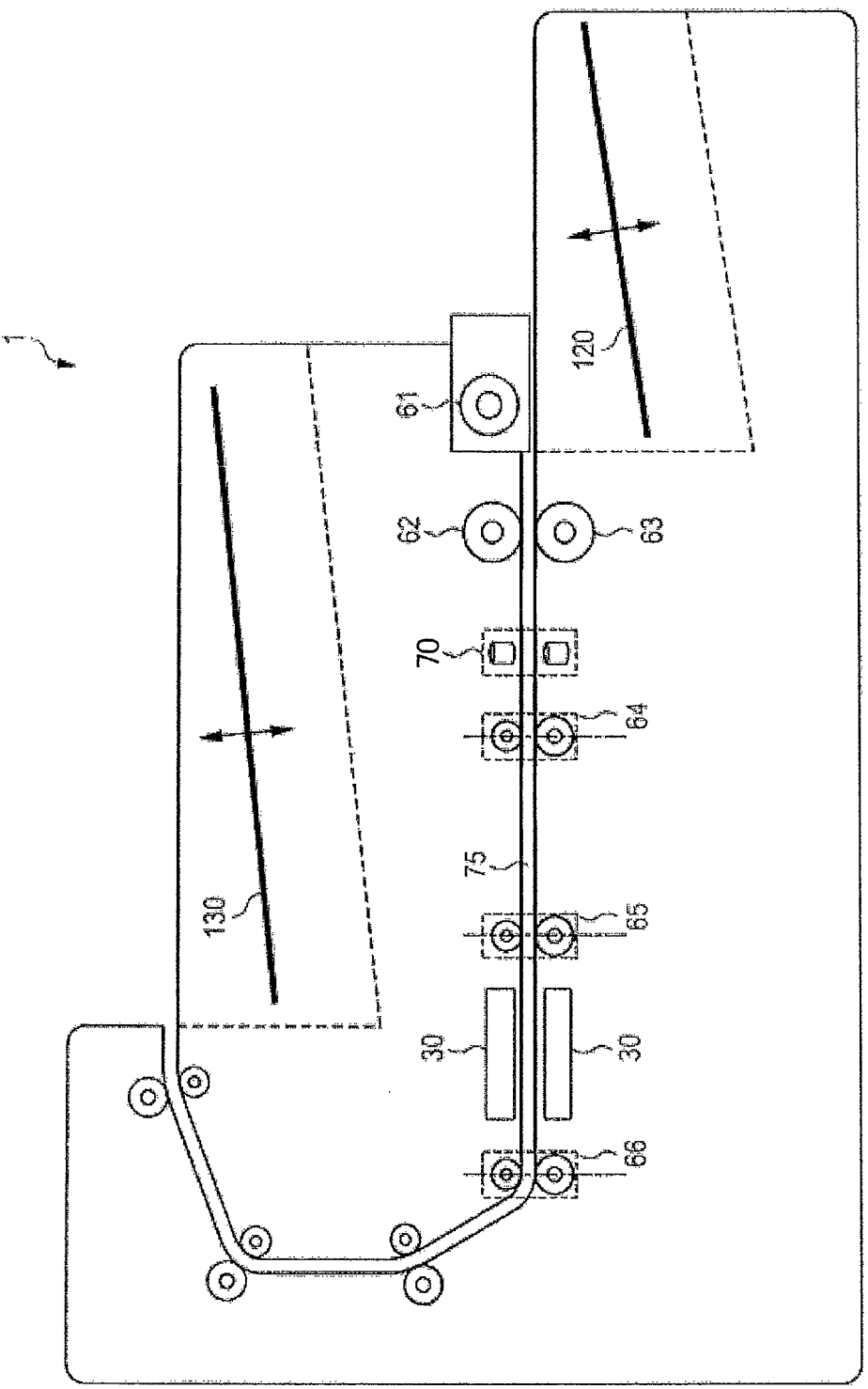
FIG. 3 is a side sectional view of the image reading apparatus according to the present exemplary embodiment.
Figure 4:
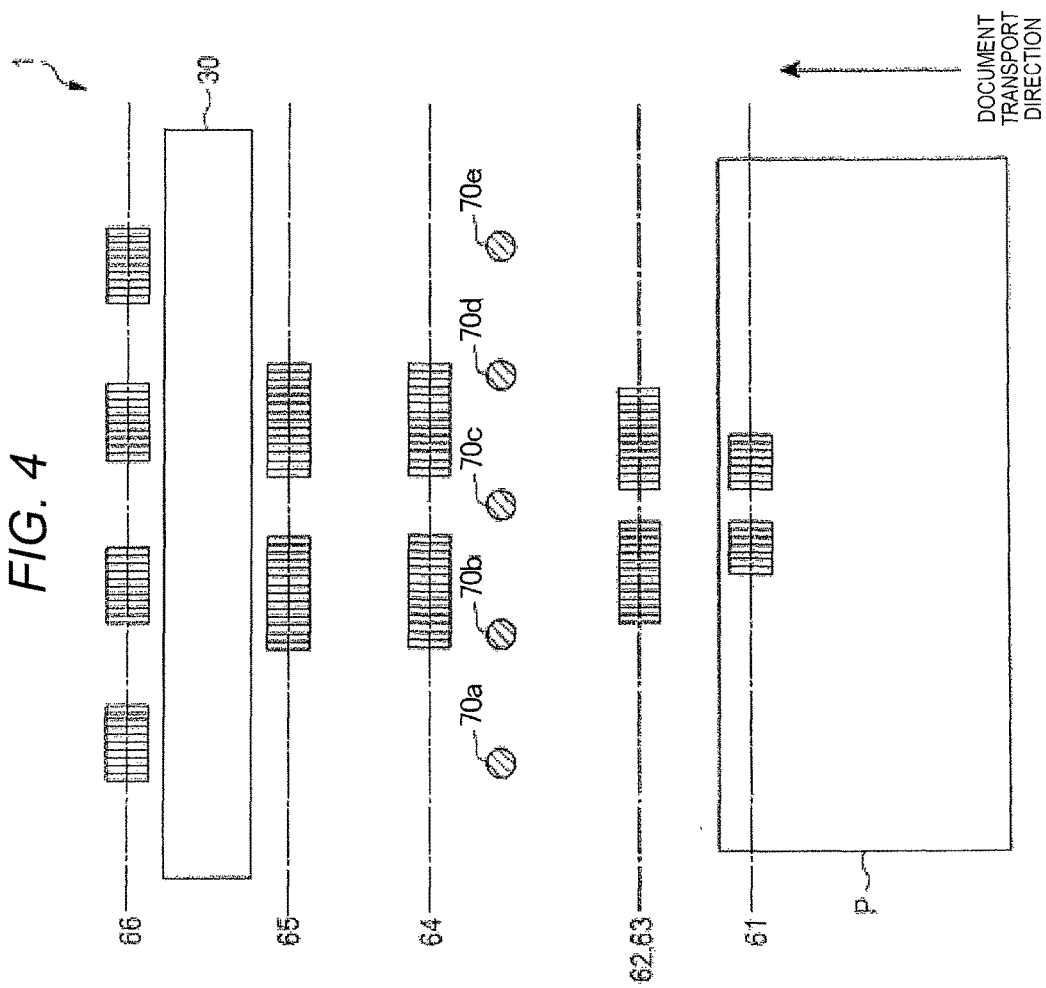
FIG. 4 is an upper sectional view of the image reading apparatus according to the present exemplary embodiment.

Hereinafter, the present exemplary embodiment will be described in detail with reference to the drawings. FIG. 1 is an overall perspective view of an image reading apparatus 1 according to the present exemplary embodiment when viewed from the front side and the upper side of the apparatus. FIG. 2 is a block diagram illustrating the functional configuration of image reading apparatus 1. FIG. 3 is a side sectional view of image reading apparatus 1. FIG. 4 is an upper sectional view of image reading apparatus 1.

Image reading apparatus 1 is a document scanner, transports (feeds) documents P stacked on document placing table 120 one by one on document transport path 75, reads the image formed on the document by image reading unit 30 disposed on document transport path 75, and then discharges (ejects) the document to document discharge unit 130. Image reading apparatus 1 may be applied to an electrophotographic image forming apparatus.

As illustrated in FIG. 2, image reading apparatus 1 includes control unit 10, operation display unit 20, image reading unit 30, auxiliary storage 40, network connection 50, transport unit 60, and double feeding detector 70.

Control unit 10 includes central processing unit (CPU) 12, and working memory such as read only memory (ROM) 14 that stores a control program (corresponding to the "document transport program" of the present disclosure), random access memory (RAM) 16, and the like. CPU 12 develops the control program in RAM 16 by reading the control program from ROM 14, and centrally controls the operation of each block and the like of image reading apparatus 1 by cooperating with the developed control program. At this time, various data stored in auxiliary storage 40 is referred to. Auxiliary storage 40 is configured by, for example, a nonvolatile semiconductor memory (so-called flash memory) or a hard disk drive. Control unit 10 functions as a "controller" of the present disclosure. Control unit 10 controls the rotational direction and the rotational speed (peripheral speed) of a plurality of transport roller pairs in transport unit 60.

Control unit 10 transmits and receives various data to and from an external device (for example, a personal computer) connected to communication network such as local area network (LAN), wide area network (WAN), or the like via network connection 50. Control unit 10 transmits the image read by image reading unit 30 to an external device (for example, a personal computer). Network connection 50 is configured by, for example, a communication control card such as a LAN card or the like.

Image reading unit 30 optically reads the image formed on the document transported through document transport path 75, photoelectrically converts the image, and outputs the converted image as image data to control unit 10. Specifically, image reading unit 30 irradiates the document with light from an exposure lamp, receives the reflected light by the light receiving surface of a solid-state imaging element such as a charge coupled device (CCD) or the like through an imaging lens, and photoelectrically converts the received light. In the present exemplary embodiment, as illustrated in FIG. 3, image reading unit 30 can collectively read images formed on both surfaces (front surface and back surface) of the document.

Operation display unit 20 functions as operation information input unit 22 and information display unit 24. Operation information input unit 22 includes various operation keys such as ten keys, a start key, or the like, receives various input operations by a user, and outputs an operation signal to control unit 10. Information display unit 24 displays various operation screens, operation status of each function, or the like according to the display control signal that is input from control unit 10.

Transport unit 60 includes a plurality of transport roller pairs for transporting the document on document transport path 75, document placing table 120, document discharge unit 130, and the like. Document placing table 120 and document discharge unit 130 are configured to be movable (liftable and lowerable) according to the number of the stacked documents.

As illustrated in FIGS. 3 and 4, paper feeding roller 61, separation roller 62 and retard roller 63 (functioning as "transport roller pair" in the present disclosure), double feeding detector 70, transport roller pair 64, transport roller pair 65, image reading unit 30, transport roller pair 66, and the like are disposed on document transport path 75, from the upstream side in the document transport direction.

Retard roller 63 is brought into pressure-contact with separation roller 62 by a predetermined pressure-contact load. Separation roller 62 rotates so as to transport documents P in the transport direction during normal document transport, and rotates so as to transport documents P in the reverse direction of the transport direction when double feeding is detected (that is, rotates reversely), under the control of control unit 10. Retard roller 63 rotates so as to transport documents P in the reverse direction of the transport direction when double feeding is detected, under the control of control unit 10.

Documents P stacked on document placing table 120 are drawn between separation roller 62 and retard roller 63 by paper feeding roller 61. Documents P that are drawn between separation roller 62 and retard roller 63 are separated and transferred one by one, and transported to transport roller pair 64. Documents P are transported to image reading unit 30 at a constant speed by transport roller pairs 64 and 65. Image reading unit 30 read the images formed on the front surface and the back surface of each of documents P. Thereafter, documents P are discharged to document discharge unit 130 by transport roller pair 66, discharge roller pair, and the like.

Double feeding detector 70 is disposed between the upstream side of transport roller pair 64 and the downstream side of separation roller 62 and retard roller 63 in the document transport direction (that is, between separation roller 62 and retard roller 63 and image reading unit 30), and detects double feeding of documents P. For example, as illustrated in FIG. 4, double feeding detector 70 is configured by a plurality (five) of double feeding detectors 70a, 70b, 70c, 70d, and 70e that are disposed at intervals in the document width direction. In the present exemplary embodiment, double feeding detectors 70a, 70b, 70c, 70d, and 70e are, for example, ultrasonic sensors or laser radars.

More specifically, double feeding detector 70 includes a transmitter and a receiver that face each other via document transport path 75, and detects whether or not the documents are double fed according to the reception intensity of the receiver with respect to the ultrasonic pulse which is normally transmitted from the transmitter. In a case where the document is not present between the transmitter and the receiver, the ultrasonic pulse reaches the receiver with very small attenuation (maximum reception intensity). In a case where one document is present, the ultrasonic pulse is absorbed into the document, and thus the reception intensity is attenuated. On the other hand, in a case where a plurality of documents are present (that is, in a case where a plurality of documents are overlapped and transported), the ultrasonic pulse transmitted from the transmitter is further largely absorbed, and the absorbed ultrasonic pulse causes multiple times of reflection between the documents. As a result, the vibration energy is greatly canceled out, and thus the reception intensity is remarkably attenuated. As described above, when the ultrasonic pulse transmitted from the transmitter is received by the receiver, in a case where the signal intensity of the ultrasonic pulse is greatly attenuated, double feeding detector 70 detects double feeding of the documents. The threshold value of the reception intensity for detecting double feeding of the documents may be set arbitrarily by a user.

When the documents are interposed and transported by separation roller 62 and retard roller 63, at the timing of detecting double feeding of the documents by double feeding detector 70, control unit 10 has a function of transporting again the documents in the document transport direction (a function of paper feeding retry), by transporting the documents in the reverse direction of the document transport direction at least until the leading edges of the double-fed documents are positioned at the upstream side of separation roller 62 and retard roller 63 by rotating separation roller 62 and retard roller 63 so as to transport the documents in the reverse direction (returning the document) and thereafter rotating separation roller 62 so as to transport the documents in the document transport direction.

Figure 5A:
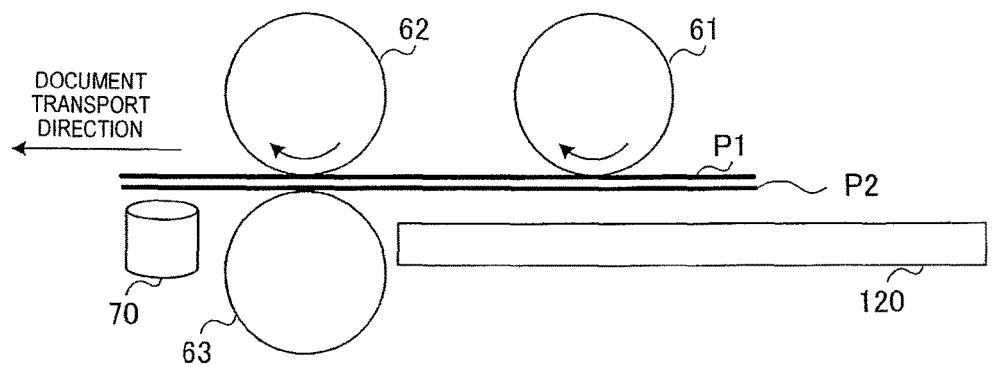
FIG. 5A is a diagram illustrating a state where double feeding occurred (pattern 1)
Figure 5B:
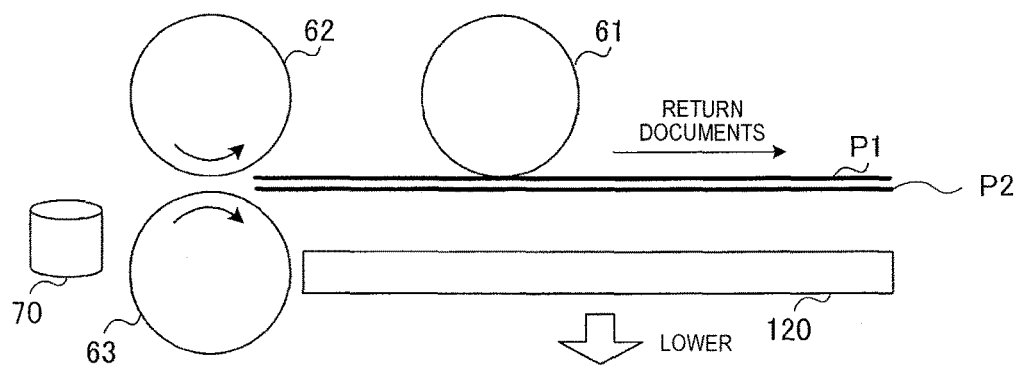
FIG. 5B is a diagram illustrating a state where double-fed documents are returned (pattern 1)
Figure 5C:
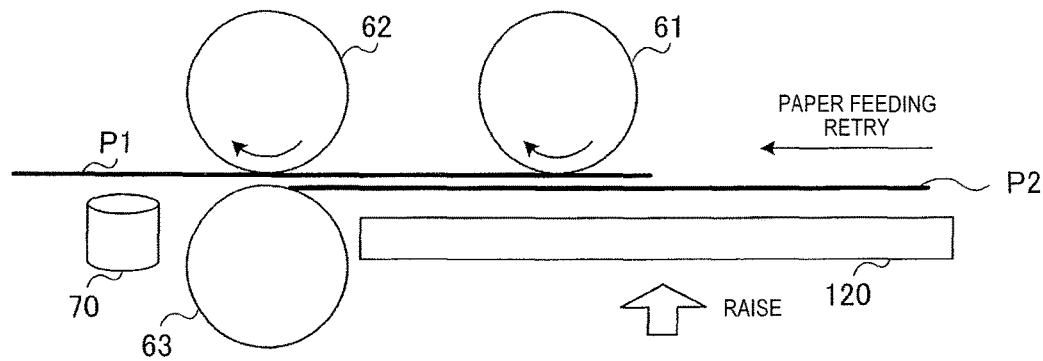
FIG. 5C is a diagram illustrating a state where paper feeding retry is performed (pattern 1)

FIGS. 5A to 5C are diagrams illustrating an operation example of the components for executing the function of paper feeding retry.

As illustrated in FIG. 5A, control unit 10 rotates paper feeding roller 61 and separation roller 62 so as to transport documents P in the document transport direction during normal document transport. At this time, control unit 10 may stop retard roller 63, or may rotate retard roller 63 such that second and subsequent documents P are not transported in the document transport direction (documents P are returned in the reverse direction of the document transport direction).

As illustrated in FIG. 5A, during normal document transport, when double feeding of documents P (P1 and P2) is detected by double feeding detector 70, as illustrated in FIG. 5B, control unit 10 rotates separation roller 62 and retard roller 63 so as to transport documents P1 and P2 in the reverse direction of the document transport direction. At this time, separation roller 62 and retard roller 63 are rotated at a constant speed. Control unit 10 transports documents P1 and P2 to the upstream side at least until the leading edges of documents P1 and P2 are positioned at the upstream side of separation roller 62 and retard roller 63. Accordingly, documents P1 and P2 are returned to the upstream side of separation roller 62 and retard roller 63. Control unit 10 may move (lower) document placing table 120 so as to decrease the frictional force between double-fed documents P1 and P2.

As illustrated in FIG. 5C, control unit 10 performs paper feeding retry. Specifically, control unit 10 rotates paper feeding roller 61 and separation roller 62 so as to transport document P1 in the document transport direction. At this time, document P2 is separated from document P1 and remains on the upstream side of separation roller 62 and retard roller 63.

In image reading apparatus 1, double feeding of documents P is avoided by the function of paper feeding retry as illustrated in FIGS. 5A to 5C.

Figure 6A:
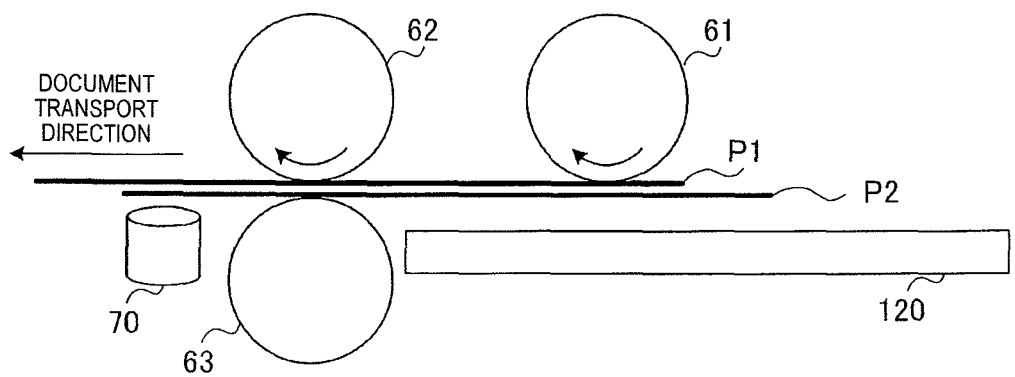
FIG. 6A is a diagram illustrating a state where double feeding occurred (pattern 2)
Figure 6B:
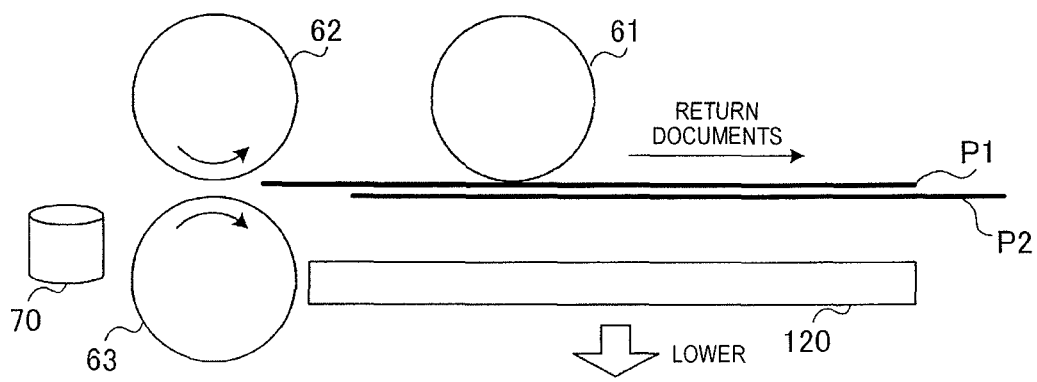
FIG. 6B is a diagram illustrating a state where double-fed documents are returned (pattern 2)
Figure 6C:
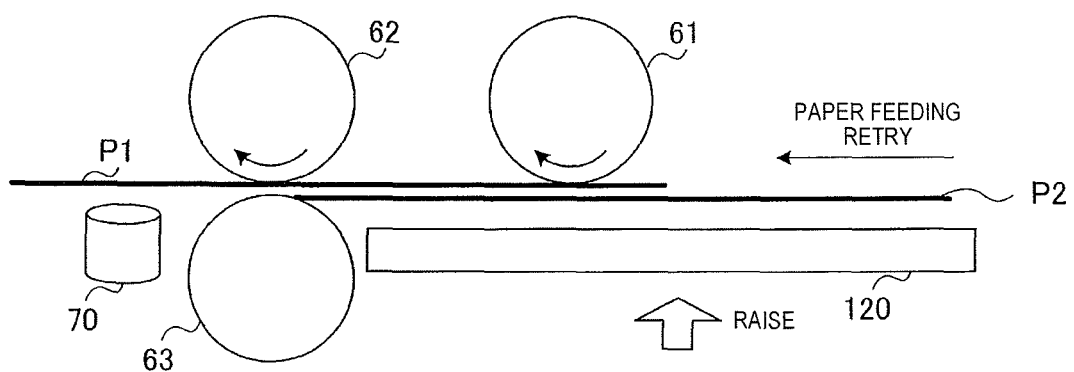
FIG. 6C is a diagram illustrating a state where paper feeding retry is performed (pattern 2)
Figure 7A:
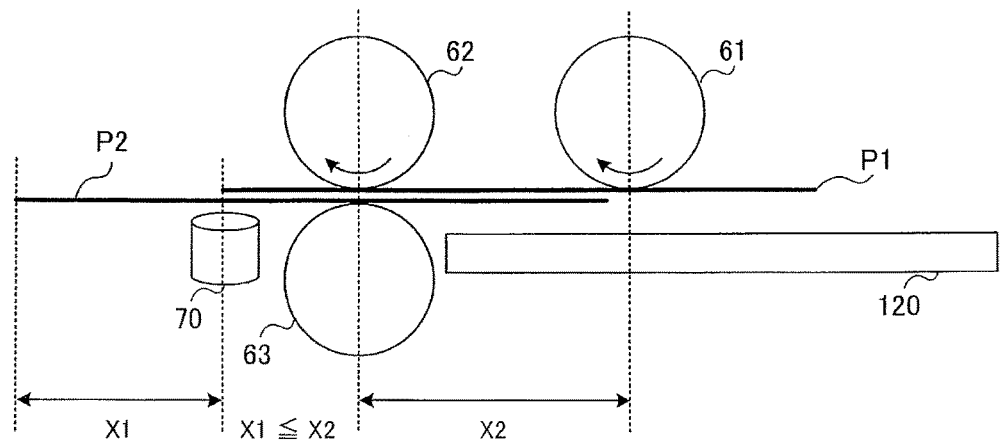
FIG. 7A is a diagram illustrating a state where double feeding occurred (pattern 3 and X1≤X2)
Figure 7B:
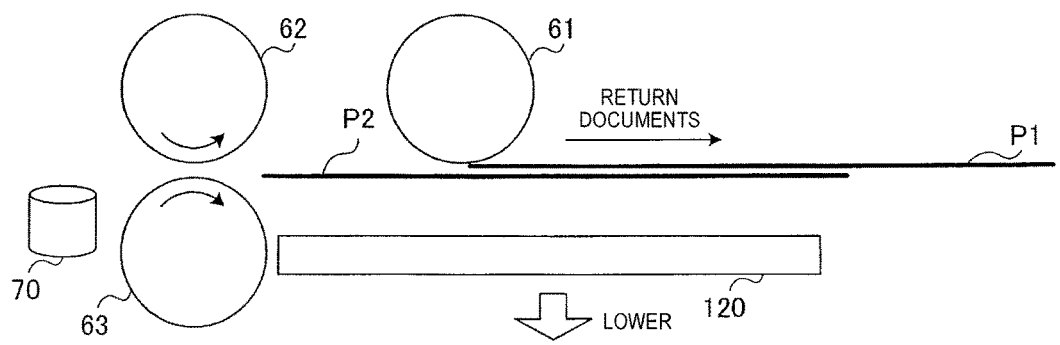
FIG. 7B is a diagram illustrating a state where double-fed documents are returned (pattern 3 and X1≤X2)
Figure 7C:
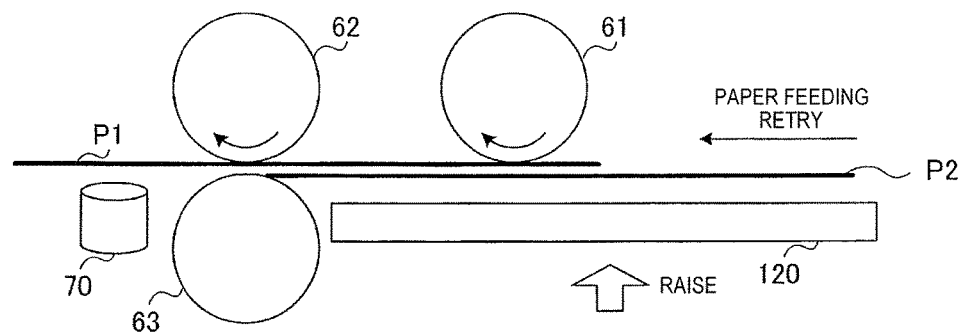
FIG. 7C is a diagram illustrating a state where paper feeding retry is performed (pattern 3 and X1≤X2)

Various patterns are assumed for the state of double feeding of documents P. Specifically, as illustrated in FIG. 5A, in addition to a pattern in which a plurality of documents P are double fed in the state where the leading edges of documents P are aligned (hereinafter, referred to as "pattern 1"), as illustrated in FIG. 6A, a pattern in which documents P are double fed in the state where second document P2 is shifted to the upstream side with respect to first document P1 (hereinafter, referred to as "pattern 2"), as illustrated in FIG. 7A, or a pattern in which documents P are double fed in the state where first document P1 is shifted to the upstream side with respect to second document P2 (hereinafter, referred to as "pattern 3") is assumed. In FIG. 7A, the distance X1 between the leading edge of document P1 and the leading edge of document P2 (shift amount between the leading edges) is equal to or less than the distance X2 between paper feeding roller 61 and separation roller 62 and retard roller 63 (inter-pitch distance) (X1≤X2).

As illustrated in FIGS. 6A to 6C and FIGS. 7A to 7C, even in the patterns 2 and 3, control unit 10 avoids double feeding of documents P by performing a paper feeding retry operation in the same manner as that of the pattern 1 (FIGS. 5A to 5C).

In image reading apparatus 1 described above, the adhesion force between documents P1 and P2 may increase by the static electricity or the frictional force (frictional resistance) between overlapped documents P1 and P2, and thus there is a case where documents P1 and P2 cannot be separated even though the paper feeding retry operation is performed as illustrated in FIGS. 5 to 7. In this case, it is necessary that image reading apparatus 1 performs paper feeding retry multiple times until documents P1 and P2 are separated.

Figure 8A:
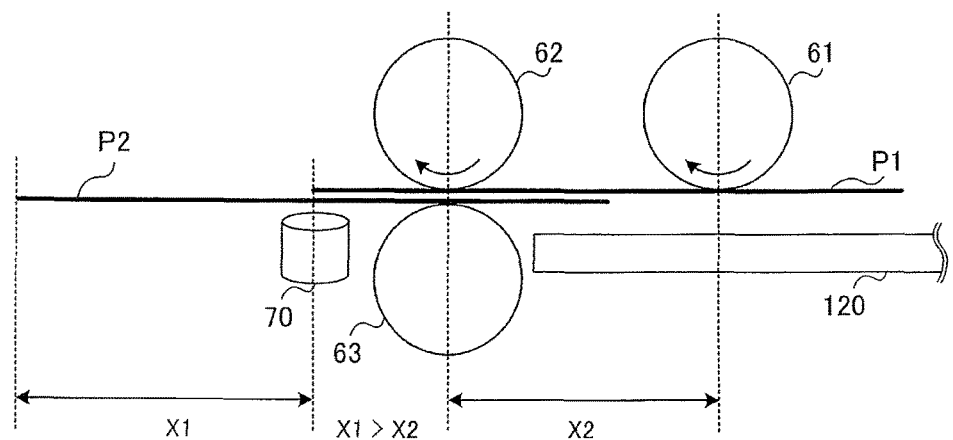
FIG. 8A is a diagram illustrating a state where double feeding occurred (pattern 3 and X1>X2)
Figure 8B:
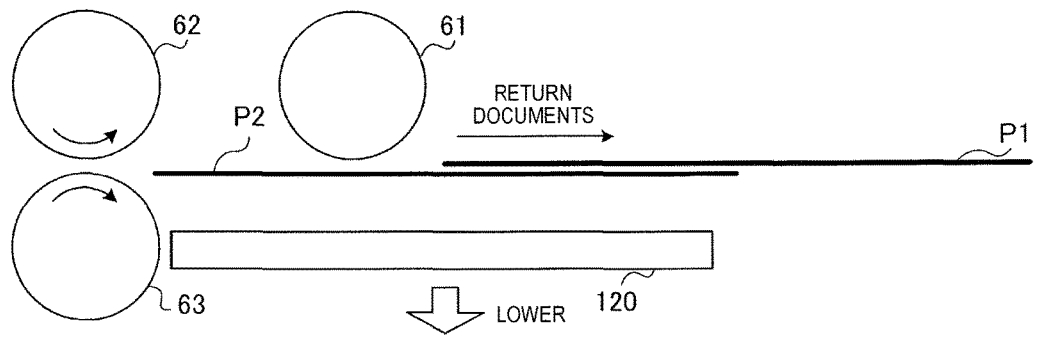
FIG. 8B is a diagram illustrating a state where double-fed documents are returned (pattern 3 and X1>X2)
Figure 8C:
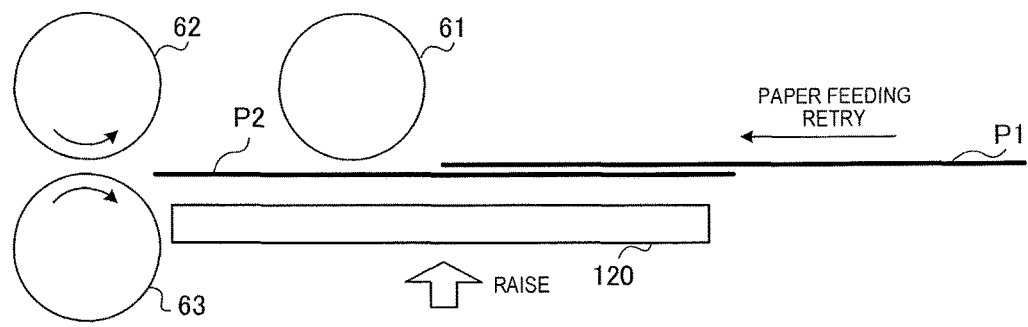
FIG. 8C is a diagram illustrating a state where paper feeding retry is performed (pattern 3 and X1>X2)

Even though paper feeding retry is performed multiple times, in some cases, double feeding cannot be avoided depending on the state of double feeding of documents P1 and P2. Specifically, as illustrated in FIG. 8A, in a case where the shift amount X1 between the leading edges of documents P1 and P2 is greater than the inter-pitch distance X2 (that is, in the case of the pattern 3 and X1>X2), as illustrated in FIG. 8B, when documents P1 and P2 are returned to the upstream side of separation roller 62 and retard roller 63, first document P1 is returned even to the upstream side of paper feeding roller 61. As a result, as illustrated in FIG. 8C, even though paper feeding retry is performed, since document P1 and paper feeding roller 61 are not in contact with each other, document P1 is not fed, and thus double feeding of documents P1 and P2 cannot be avoided. For example, in a case where the sizes of documents P1 and P2 are different from each other, the double feeding state illustrated in FIG. 8A may occur.

Therefore, in the present exemplary embodiment, in a case where double feeding of documents P is detected by double feeding detector 70, when double-fed documents P are returned to the upstream side of separation roller 62 and retard roller 63, control unit 10 controls separation roller 62 and retard roller 63 such that the rotation speed of retard roller 63 is faster than the rotation speed (peripheral speed) of separation roller 62, thereby reliably avoiding double feeding of documents P.

Hereinafter, the paper feeding retry operation of image reading apparatus 1 according to the present exemplary embodiment when double feeding of documents P is detected by double feeding detector 70 will be described in detail.

Pattern 1

Figure 9A:
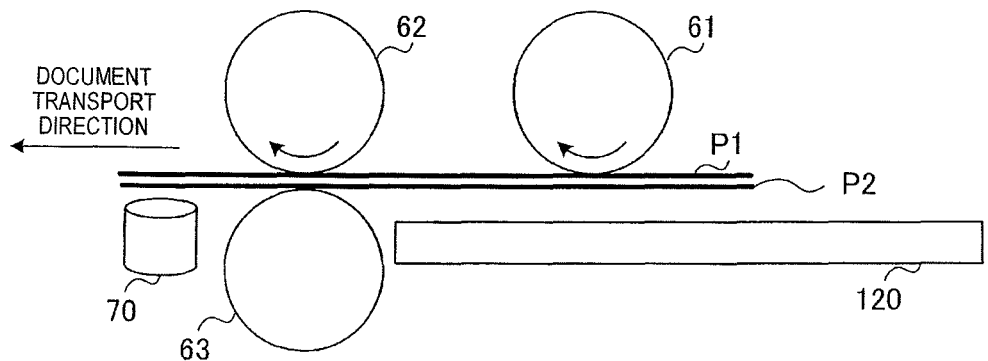
FIG. 9A is a diagram illustrating a state where double feeding occurred in the present exemplary embodiment (pattern 1)
Figure 9B:
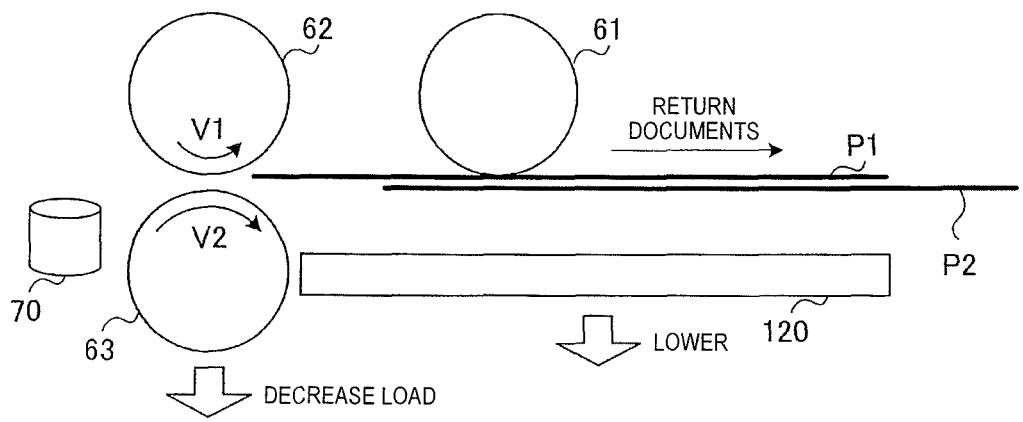
FIG. 9B is a diagram illustrating a state where double-fed documents are returned in the present exemplary embodiment (pattern 1)
Figure 9C:
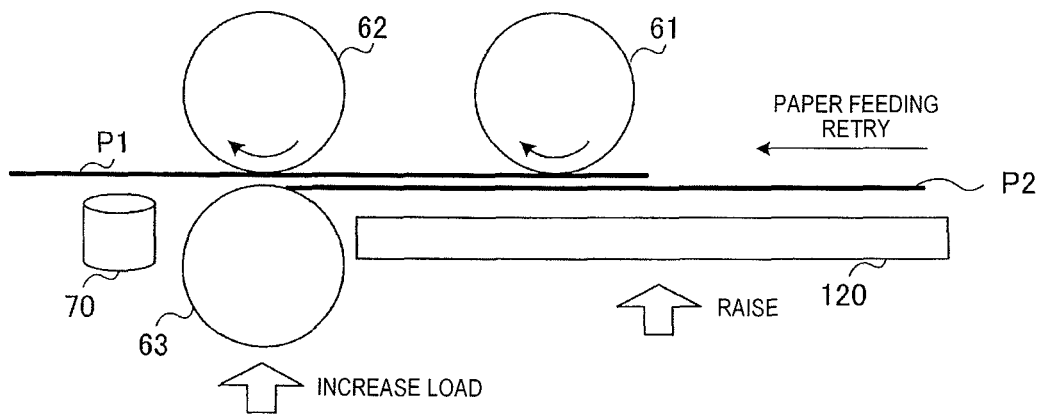
FIG. 9C is a diagram illustrating a state where paper feeding retry is performed in the present exemplary embodiment (pattern 1)

FIGS. 9A to 9C are diagrams illustrating an example of the paper feeding retry operation of the pattern 1. Specifically, as illustrated in FIG. 9A, double feeding detector 70 detects double feeding of documents P1 and P2 in a state where the leading edges of documents P1 and P2 are aligned.

In this case, as illustrated in FIG. 9B, control unit 10 rotates separation roller 62 and retard roller 63 so as to transport documents P1 and P2 in the reverse direction of the document transport direction. At this time, control unit 10 rotates separation roller 62 and retard roller 63 such that the rotation speed V2 of retard roller 63 is faster than the rotation speed V1 of separation roller 62. Accordingly, the transport speed of second document P2 that is in contact with retard roller 63 to the upstream side is faster than the transport speed of first document P1 that is in contact with separation roller 62 to the upstream side.

Therefore, as illustrated in FIG. 9A, when double feeding of documents P1 and P2 is detected, the leading edges of documents P1 and P2 are aligned, whereas as illustrated in FIG. 9B, when documents P1 and P2 are returned to the upstream side, the leading edge of document P2 is positioned at the upstream side of the leading edge of document P1.

For example, in a case where documents P1 and P2 are returned to the upstream side, as illustrated in FIG. 5B, when separation roller 62 and retard roller 63 are rotated at the same speed, even though documents P1 and P2 are returned to the upstream side, the leading edges of documents P1 and P2 remain aligned in a state of being in close contact with each other. Thus, there is a possibility that documents P1 and P2 cannot be separated even though paper feeding retry is performed. On the other hand, as illustrated in FIG. 9B, image reading apparatus 1 can separate document P2 from document P1 to the upstream side by setting the rotation speed V2 of retard roller 63 to be faster than the rotation speed V1 of separation roller 62 and performing the operation of returning documents P1 and P2 to the upstream side. Therefore, documents P1 and P2 can be reliably separated from each other.

In the present exemplary embodiment, the pressure-contact load of retard roller 63 against separation roller 62 may be adjusted under the control of control unit 10. For example, image reading apparatus 1 may include load adjustment unit 80 that adjusts the pressure-contact load of retard roller 63 against separation roller 62. FIG. 10 is a diagram illustrating a configuration example of load adjustment unit 80.

As illustrated in FIG. 10, load adjustment unit 80 is configured to include compression spring 81, pressing member 82, and cam 83.

Retard roller 63 is connected to cam 83 via compression spring 81 and pressing member 82. Control unit 10 changes the position of pressing member 82 by rotating cam 83 around shaft 83a. As the position of pressing member 82 changes, the compressibility of compression spring 81 changes, and thus the pressing force that is applied to retard roller 63 by compression spring 81 changes. In other words, as the compressibility of compression spring 81 becomes lower, the pressure-contact load of retard roller 63 against separation roller 62 becomes lower. In this way, load adjustment unit 80 adjusts the pressure-contact load of retard roller 63 against separation roller 62 by changing the compressibility of compression spring 81.

When double feeding of documents P (P1 and P2) is detected by double feeding detector 70, control unit 10 controls load adjustment unit 80 so as to decrease the pressure-contact load of retard roller 63 against separation roller 62 to be lower than the pressure-contact load thereof before double feeding of documents P is detected. For example, as illustrated in FIG. 9B, when double-fed documents P1 and P2 are returned to the upstream side, control unit 10 sets the pressure-contact load of retard roller 63 against separation roller 62 lower than the pressure-contact load that is set during normal document transport. Accordingly, since the pressure-contact force between separating roller 62 and retard roller 63 decreases, when double-fed documents P1 and P2 are returned to the upstream side, the frictional force between documents P1 and P2 at separating roller 62 and retard roller 63 decreases, and thus documents P1 and P2 are likely to be separated from each other.

As illustrated in FIG. 9B, when double feeding of documents is detected by double feeding detector 70, control unit 10 may control the movement (lowering) of document placing table 120 so as to decrease the frictional force between documents P1 and P2 to be lower than the frictional force between documents P1 and P2 before double feeding of documents P1 and P2 is detected.

Next, as illustrated in FIG. 9C, control unit 10 raises document placing table 120 from the state of FIG. 9B, increases the pressure-contact load of retard roller 63 against separation roller 62 to the pressure-contact load thereof that is set during normal document transport, and performs paper feeding retry. In FIG. 9B, since document P1 and document P2 are separated from each other, as illustrated in FIG. 9C, document P1 is transported on document transport path 75 by separation roller 62, whereas document P2 remains on the upstream side of retard roller 63.

As described above, in the pattern 1, image reading apparatus 1 can reliably transport first document P1 by paper feeding retry without double feeding.

Pattern 2

Figure 11A:
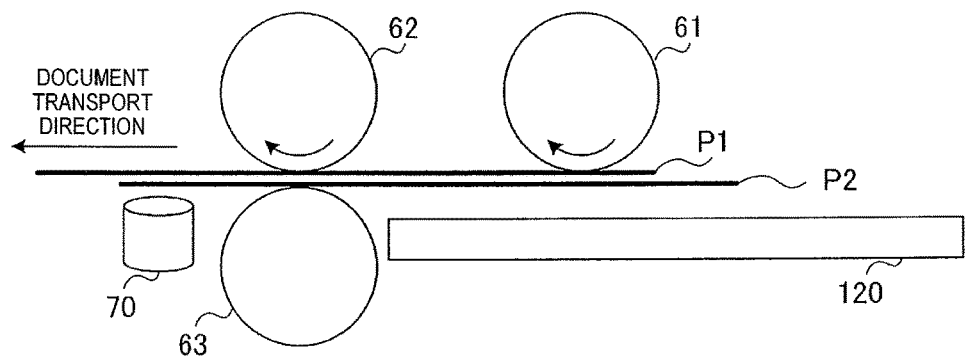
FIG. 11A is a diagram illustrating a state where double feeding occurred in the present exemplary embodiment (pattern 2)
Figure 11B:
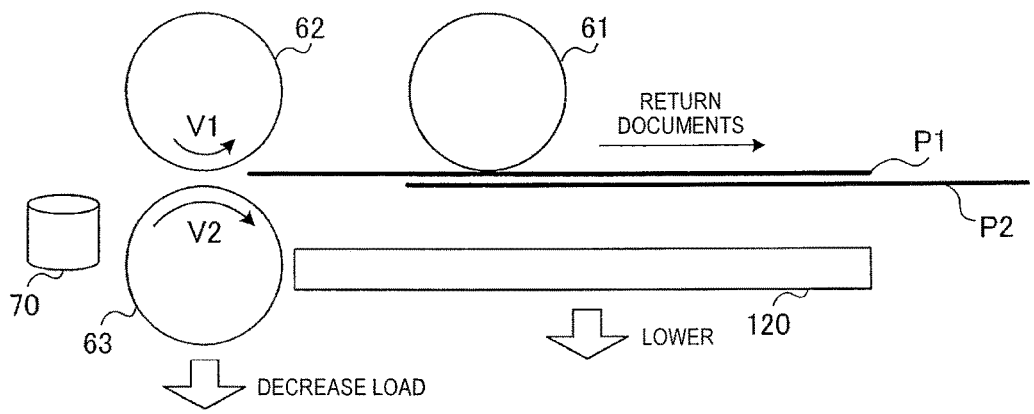
FIG. 11B is a diagram illustrating a state where double-fed documents are returned in the present exemplary embodiment (pattern 2)
Figure 11C:
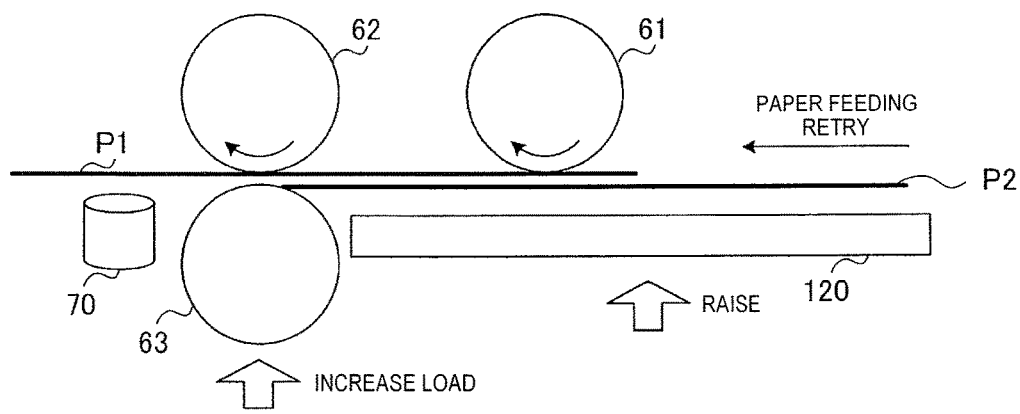
FIG. 11C is a diagram illustrating a state where paper feeding retry is performed in the present exemplary embodiment (pattern 2)

FIGS. 11A to 11C are diagrams illustrating an example of the paper feeding retry operation of the pattern 2. Specifically, as illustrated in FIG. 11A, double feeding detector 70 detects double feeding of documents P1 and P2 in a state where the leading edge of document P2 is shifted to the upstream side with respect to the leading edge of document P1.

In this case, as illustrated in FIG. 11B, control unit 10 rotates separation roller 62 and retard roller 63 so as to transport documents P1 and P2 in the reverse direction of the document transport direction. At this time, similarly to the pattern 1, control unit 10 rotates separation roller 62 and retard roller 63 such that the rotation speed V2 of retard roller 63 is faster than the rotation speed V1 of separation roller 62.

Similarly to the pattern 1 (FIG. 9B), as illustrated in FIG. 11B, when double-fed documents P1 and P2 are returned to the upstream side, control unit 10 may lower retard roller 63 and document placing table 120.

Accordingly, as illustrated in FIG. 11B, when documents P1 and P2 are returned to the upstream side, the leading edge of document P2 is positioned at the further upstream side of the leading edge of document P1, compared to the timing at which double feeding of documents P1 and P2 is detected as illustrated in FIG. 11A. In other words, as illustrated in FIG. 11B, image reading apparatus 1 can separate document P2 from document P1 to the upstream side by setting the rotation speed V2 of retard roller 63 to be faster than the rotation speed V1 of separation roller 62 and performing the operation of returning documents P1 and P2 to the upstream side. Therefore, documents P1 and P2 can be reliably separated from each other.

Next, as illustrated in FIG. 11C, control unit 10 raises document placing table 120 from the state of FIG. 11B, increases the pressure-contact load of retard roller 63 against separation roller 62 to the pressure-contact load thereof that is set during normal document transport, and performs paper feeding retry. In FIG. 11B, since document P1 and document P2 are separated from each other, as illustrated in FIG. 11C, document P1 is transported on document transport path 75 by separation roller 62, whereas document P2 remains on the upstream side of retard roller 63.

As described above, in the pattern 2, image reading apparatus 1 can reliably transport first document P1 by paper feeding retry without double feeding.

Pattern 3

Figure 12:
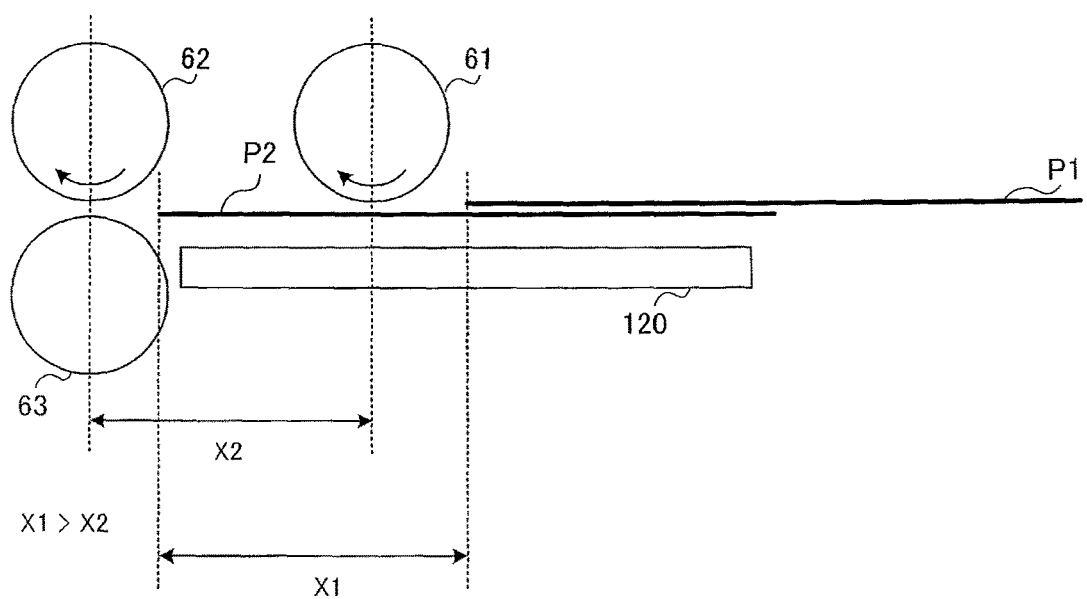
FIG. 12 is a diagram illustrating a state where paper feeding retry is performed in the present exemplary embodiment (pattern 3 and X1>X2)

In the following, as illustrated in FIG. 12, a case where the shift amount X1 between the leading edges of documents P1 and P2 is greater than the inter-pitch distance X2 (case of X1>X2) will be described.

The shift amount X1 between the leading edges of documents P1 and P2 may be calculated by double feeding detector 70, for example. For example, double feeding detector 70 may calculate the shift amount X1 by multiplying the time from the detection of the leading edge of document P2 to the detection of the leading edge of document P1 by the transport speed of documents P1 and P2 in the document transport direction.

Figure 13A:
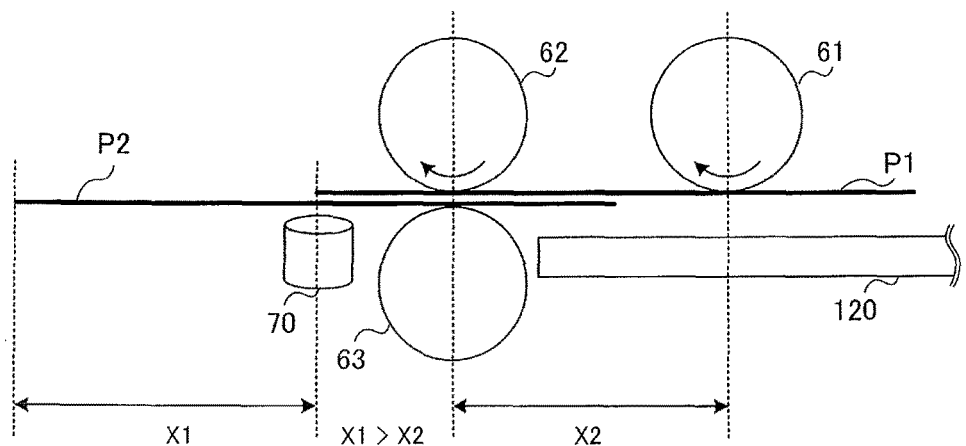
FIG. 13A is a diagram illustrating a state where double feeding occurred in the present exemplary embodiment (pattern 3 and X1>X2)
Figure 13B:
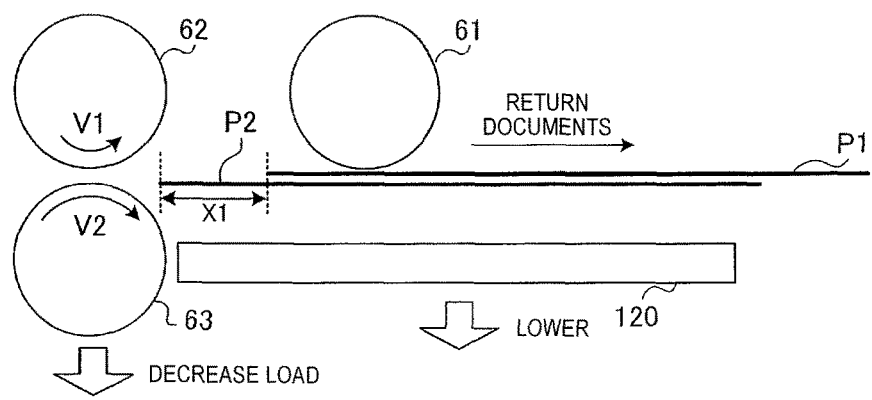
FIG. 13B is a diagram illustrating a state where double-fed documents are returned in the present exemplary embodiment (pattern 3 and X1>X2)
Figure 13C:
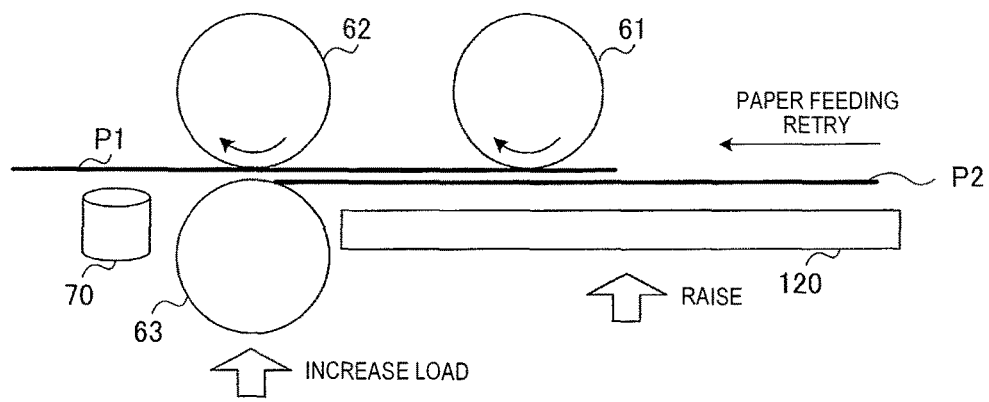
FIG. 13C is a diagram illustrating a state where paper feeding retry is performed in the present exemplary embodiment (pattern 3 and X1>X2).

FIGS. 13A to 13C are diagrams illustrating an example of the paper feeding retry operation of the pattern 3. Specifically, as illustrated in FIG. 13A, double feeding detector 70 detects double feeding of documents P1 and P2 in a state where the leading edge of document P1 is shifted to the upstream side with respect to the leading edge of document P2 (in a state of X1>X2).

In this case, as illustrated in FIG. 13B, control unit 10 rotates separation roller 62 and retard roller 63 so as to transport documents P1 and P2 in the reverse direction of the document transport direction. At this time, similarly to the pattern 1 and the pattern 2, control unit 10 rotates separation roller 62 and retard roller 63 such that the rotation speed V2 of retard roller 63 is faster than the rotation speed V1 of separation roller 62.

Similarly to the pattern 1 and the pattern 2 (FIG. 9B and FIG. 11B), as illustrated in FIG. 13B, when double-fed documents P1 and P2 are returned to the upstream side, control unit 10 may lower retard roller 63 and document placing table 120.

Accordingly, as illustrated in FIG. 13B, when documents P1 and P2 are returned to the upstream side, the shift amount X1 between the leading edges of documents P1 and P2 decreases, compared to the timing at which double feeding of documents P1 and P2 is detected as illustrated in FIG. 13A.

As illustrated in FIG. 13B, image reading apparatus 1 can separate document P2 from document P1 by setting the rotation speed V2 of retard roller 63 to be faster than the rotation speed V1 of separation roller 62 and performing the operation of returning documents P1 and P2 to the upstream side. Therefore, documents P1 and P2 can be reliably separated from each other.

Next, as illustrated in FIG. 13C, control unit 10 raises document placing table 120 from the state of FIG. 13B, increases the pressure-contact load of retard roller 63 against separation roller 62 to the pressure-contact load thereof that is set during normal document transport, and performs paper feeding retry.

In FIG. 13B, in a case where the shift amount X1 is equal to or less than the inter-pitch distance X2 (X1≤X2) when documents P1 and P2 are returned to the upstream side, that is, in a case where the leading edge of document P1 is positioned at the downstream side of paper feeding roller 61 when the leading edge of document P2 is returned to the upstream side of separation roller 62 and retard roller 63, image reading apparatus 1 can transport document P1 to the downstream side by paper feeding roller 61 according to the paper feeding retry operation illustrated in FIG. 13C.

In FIG. 13B, since document P1 and document P2 are separated from each other, as illustrated in FIG. 13C, document P1 is transported on document transport path 75 by separation roller 62, whereas document P2 remains on the upstream side of retard roller 63.

For example, in a case where documents P1 and P2 are returned to the upstream side, as illustrated in FIG. 8B, when separation roller 62 and retard roller 63 are rotated at the same speed, even though documents P1 and P2 are returned to the upstream side, the state of X1>X2 is maintained. As a result, double feeding of documents P1 and P2 cannot be avoided even though paper feeding retry is performed. On the other hand, as illustrated in FIG. 13B, image reading apparatus 1 decreases the shift amount X1 by setting the rotation speed V2 of retard roller 63 to be faster than the rotation speed V1 of separation roller 62 and performing the operation of returning documents P1 and P2 to the upstream side. Therefore, the state of X1≤X2 can be set. Accordingly, image reading apparatus 1 can transport only document P1 by paper feeding roller 61 and separation roller 62 according to paper feeding retry.

As described above, in the pattern 3, image reading apparatus 1 can reliably transport first document P1 by paper feeding retry without double feeding.

The paper feeding retry operations according to the patterns 1 to 3 are described above.

As described above in detail, in the present exemplary embodiment, in a case where double feeding of documents P is detected by double feeding detector 70, image reading apparatus 1 separates double-fed documents P from each other when transporting documents P in the reverse direction of the document transport direction, by setting the rotation speed V2 of retard roller 63 to be faster than the rotation speed V1 of separation roller 62.

According to the present exemplary embodiment with the above-described configuration, it is possible to reliably avoid double feeding of documents.

Modification Example 1 of Present Exemplary Embodiment

In the pattern 3 (FIG. 13A) of the present exemplary embodiment, although the value of the shift amount X1 is decreased, depending on the magnitude of the shift amount X1 with respect to the inter-pitch distance X2, there is a case where the state of X1≤X2 is not set (the state of X1>X2 remains as it is) and thus double feeding of documents P may not be avoided by one paper feeding retry operation. In this case, control unit 10 may set the state of X1≤X2 by performing the paper feeding retry illustrated in FIGS. 13A to 13C multiple times, thereby avoiding double feeding of documents P.

Modification Example 2 of Present Exemplary Embodiment

In the above exemplary embodiment, control unit 10 may adjust the ratio between the rotation speed V1 of separation roller 62 and the rotation speed V2 of retard roller 63 according to the shift amount X1 between the leading edges of double-fed documents P1 and P2 (or the ratio between the shift amount X1 and the inter-pitch distance X2).

For example, as the shift amount X1 is greater, control unit 10 may increase the ratio of the rotation speed V2 of retard roller 63 with respect to the rotation speed V1 of separation roller 62. Accordingly, the greater the shift amount X1, the faster the transport speed of document P2 when returning documents P1 and P2 to the upstream side, and thus the shift amount X1 can be further decreased. That is, image reading apparatus 1 can separate document P1 from document P2 and transport separated document P1 by setting the state of X1≤X2 from the state of X1>X2 by one paper feeding retry operation.

Modification Example 3 of Present Exemplary Embodiment

In the above exemplary embodiment, control unit 10 may adjust the ratio between the rotation speed V1 of separation roller 62 and the rotation speed V2 of retard roller 63 according to the frictional force between double-fed documents P1 and P2.

Here, the frictional force between documents P1 and P2 depends on, for example, the paper type of documents P1 and P2 and the temperature and humidity environment at the time of operation. As the ratio of the rotation speed V2 of retard roller 63 with respect to the rotation speed V1 of separation roller 62 is higher, the force of separating document P2 from document P1 becomes greater, and thus documents P1 and P2 are likely to be separated from each other.

Therefore, as the frictional force between documents P1 and P2 is larger, control unit 10 may increase the ratio of the rotation speed V2 of retard roller 63 with respect to the rotation speed V1 of separation roller 62. Accordingly, image reading apparatus 1 can reliably separate document P2 from document P1 and transport separated document P2 by adjusting the rotation speeds V1 and V2 according to the frictional force between documents P1 and P2.

Modification Example 4 of Present Exemplary Embodiment

In the above exemplary embodiment, when returning double-fed documents P1 and P2 to the upstream side, as documents P1 and P2 are thinner, control unit 10 may control load adjustment unit 80 so as to increase the reduction degree of the pressure-contact load of retard roller 63 against separation roller 62.

In a case where the reduction degree of the pressure-contact load of retard roller 63 against separation roller 62 is increased, the force of interposing documents by separation roller 62 and retard roller 63 is decreased. In a case where documents P are thick, even though the force of interposing document by separation roller 62 and retard roller 63 is not significantly decreased, it is possible to transport documents P without giving damage such as a wrinkle or the like on documents P. On the other hand, in a case where documents P are thin, it is possible to transport documents P without giving damage such as a wrinkle or the like on documents P by decreasing the force of interposing document by separation roller 62 and retard roller 63 within a range in which documents P can be interposed.

Therefore, when returning double-fed documents P1 and P2 to the upstream side, control unit 10 may decrease the pressure-contact load of retard roller 63 against separation roller 62 according to the thicknesses of documents P1 and P2 within a range in which documents P1 and P2 can be interposed and transported. Accordingly, image reading apparatus 1 can easily separate documents P1 and P2 from each other while interposing and transporting documents P1 and P2.

As described above, modification examples 1 to 4 of the present exemplary embodiment are described.

The exemplary embodiment and the examples disclosed herein have been presented by way of example only for embodying the present disclosure, and are not intended to limit the scope of the present disclosure. That is, the present disclosure can be embodied in various forms without departing from the spirit or the main features thereof.

For example, although a case where the exemplary embodiment is applied to an image reading apparatus has been described, the present disclosure is not limited thereto, and can also be applied to a paper feeding device or the like of an image forming apparatus.

What is claimed is:

1. An image reading apparatus that transports a document stacked on a document placing table on the document transport path and reads an image on the document, comprising:
   a transport roller pair that includes a separation roller and a retard roller, and that transport the document interposed between the separation roller and the retard roller;
   an image reader that is disposed at a downstream side of the transport roller pair in the transport direction of the document, and that reads the image on the document;
   a double feeding detector that is disposed between the transport roller pair and the image reader in the transport direction, and that detects double feeding of documents; and
   a controller that controls rotation of the separation roller and rotation of the retard roller,
   wherein, when double feeding of documents is detected by the double feeding detector, the controller transports the documents in a direction reverse to the transport direction at least until the leading edges of the double-fed documents are positioned at the upstream side of the transport roller pair by rotating the separation roller and the retard roller so as to transport the documents in the reverse direction, and then transports the documents in the transport direction by rotating only the separation roller of the transport roller pair so as to transport the documents in the transport direction, and
   wherein, when the documents are transported in the reverse direction, the controller sets a second rotation speed of the retard roller to be faster than a first rotation speed of the separation roller.

2. The apparatus of claim 1,
   wherein, when the documents are transported in the reverse direction, the controller increases the ratio of the second rotation speed with respect to the first rotation speed, as the shift amount between the leading edges of double-fed documents at the timing of detecting double feeding of the documents by double feeding detector is increased.

3. The apparatus of claim 1,
   wherein, when the documents are transported in the reverse direction, the controller increases the ratio of the second rotation speed with respect to the first rotation speed, as the frictional force between the double-fed documents is increased.

4. The apparatus of claim 1,
   wherein the retard roller is brought into press-contact with the separation roller,
   wherein the apparatus further comprises a load adjuster that adjusts the pressure-contact load of the retard roller against the separation roller, and wherein, when double feeding of the documents is detected by the double feeding detector, the controller controls the load adjuster so as to decrease the pressure-contact load to be lower than the pressure-contact load before double feeding of documents is detected.

5. The apparatus of claim 4,
wherein the controller controls the load adjuster so as to increase the reduction degree of the pressure-contact load as the documents are thinner.

6. The apparatus of claim 1,
wherein the document placing table is configured to be movable, and
wherein, when double feeding of the documents is detected by the double feeding detector, the controller controls the movement of the document placing table so as to decrease the frictional force between the documents to be lower than the frictional force between the documents before double feeding of the documents is detected.

7. A document transport method used for an image reading apparatus that transports a document stacked on a document placing table on the document transport path and reads an image on the document,
wherein the image reading apparatus comprises:
a transport roller pair that includes a separation roller and a retard roller, and that transport the document interposed between the separation roller and the retard roller;
an image reader that is disposed at a downstream side of the transport roller pair in the transport direction of the document, and that reads the image on the document;
a double feeding detector that is disposed between the transport roller pair and the image reader in the transport direction, and that detects double feeding of documents; and
a controller that controls rotation of the separation roller and rotation of the retard roller,
the method comprising:
when double feeding of the documents is detected by the double feeding detector, transporting, by the controller, the documents in a direction reverse to the transport direction at least until the leading edges of the double-fed documents are positioned at the upstream side of the transport roller pair by rotating the separation roller and the retard roller so as to transport the documents in the reverse direction, and then transporting the documents in the transport direction by rotating only the separation roller, of the transport roller pair, so as to transport the documents in the transport direction, and
when the documents are transported in the reverse direction, setting, by the controller, a second rotation speed of the retard roller to be faster than a first rotation speed of the separation roller.

8. The document transport method according to claim 7, when the documents are transported in the reverse direction, the setting of the second rotation speed of the retard roller is variably set.

9. The method of claim 7,
wherein, when the documents are transported in the reverse direction, the ratio of the second rotation speed with respect to the first rotation speed is increased, as the shift amount between the leading edges of double-fed documents at the timing of detecting double feeding of the documents is increased.

10. The method of claim 7,
wherein, when the documents are transported in the reverse direction, the ratio of the second rotation speed with respect to the first rotation speed is increased, as the frictional force between the double-fed documents is increased.

11. The method of claim 7, further comprising
bringing the retard roller into press-contact with the separation roller, and
adjusting the pressure-contact load of the retard roller against the separation roller,
wherein, when double feeding of the documents is detected, the load adjuster is controlled so as to decrease the pressure-contact load to be lower than the pressure-contact load before double feeding of documents is detected.

12. The method of claim 11, further comprising
controlling the load adjuster so as to increase the reduction degree of the pressure-contact load as the documents are thinner.

13. The method of claim 7,
wherein the document placing table is configured to be movable, and
when double feeding of the documents is detected
controlling the movement of the document placing table so as to decrease the frictional force between the documents to be lower than the frictional force between the documents before double feeding of the documents is detected.

14. An image reading apparatus that transports a document stacked on a document placing table on the document transport path and reads an image on the document, comprising:
a transport roller pair that includes a separation roller and a retard roller, and that transport the document interposed between the separation roller and the retard roller;
an image reader that is disposed at a downstream side of the transport roller pair in the transport direction of the document, and that reads the image on the document;
a double feeding detector that is disposed between the transport roller pair and the image reader in the transport direction, and that detects double feeding of documents; and
a controller that controls rotation of the separation roller and rotation of the retard roller,
wherein, when double feeding of documents is detected by the double feeding detector, the controller transports the documents in a direction reverse to the transport direction at least until the leading edges of the double-fed documents are positioned at the upstream side of the transport roller pair by rotating the separation roller and the retard roller so as to transport the documents in the reverse direction, and then transports the documents in the transport direction by rotating the separation roller so as to transport the documents in the transport direction, and
wherein, when the documents are transported in the reverse direction, the controller sets a second rotation speed of the retard roller to be variably faster than a first rotation speed of the separation roller.

15. The apparatus of claim 14,
wherein, when the documents are transported in the reverse direction, the controller increases the ratio of the second rotation speed with respect to the first rotation speed, as the shift amount between the leading edges of double-fed documents at the timing of detecting double feeding of the documents by double feeding detector is increased.

16. The apparatus of claim 14,
wherein, when the documents are transported in the reverse direction, the controller increases the ratio of the second rotation speed with respect to the first rotation speed, as the frictional force between the double-fed documents is increased.

17. The apparatus of claim 14,
the apparatus further comprises a load adjuster that adjusts the pressure-contact load of the retard roller against the separation roller,
wherein the retard roller is brought into press-contact with the separation roller, and
when double feeding of the documents is detected by the double feeding detector, the controller controls the load adjuster so as to decrease the pressure-contact load to be lower than the pressure-contact load before double feeding of documents is detected.

18. The apparatus of claim 17,
wherein the controller controls the load adjuster so as to increase the reduction degree of the pressure-contact load as the documents are thinner.

19. The apparatus of claim 14,
wherein the document placing table is configured to be movable, and
when double feeding of the documents is detected by the double feeding detector, the controller controls the movement of the document placing table so as to decrease the frictional force between the documents to be lower than the frictional force between the documents before double feeding of the documents is detected.

* * * * *